May 29, 1962 E. M. SCHMIDT 3,037,158
PROTECTIVE RECYCLING CIRCUIT FOR STATIC INVERTER
Filed Oct. 28, 1959
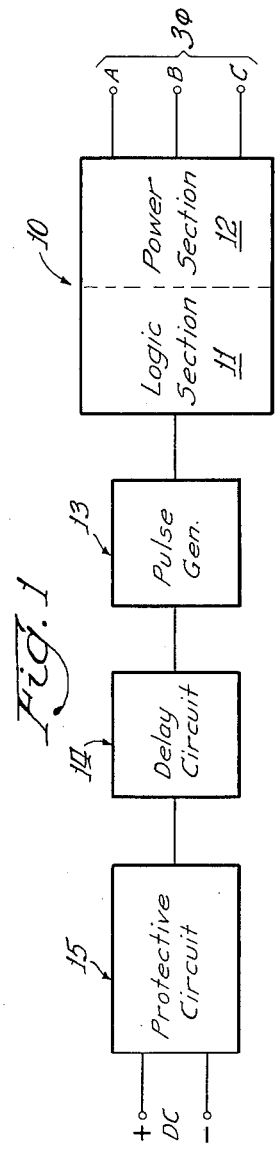
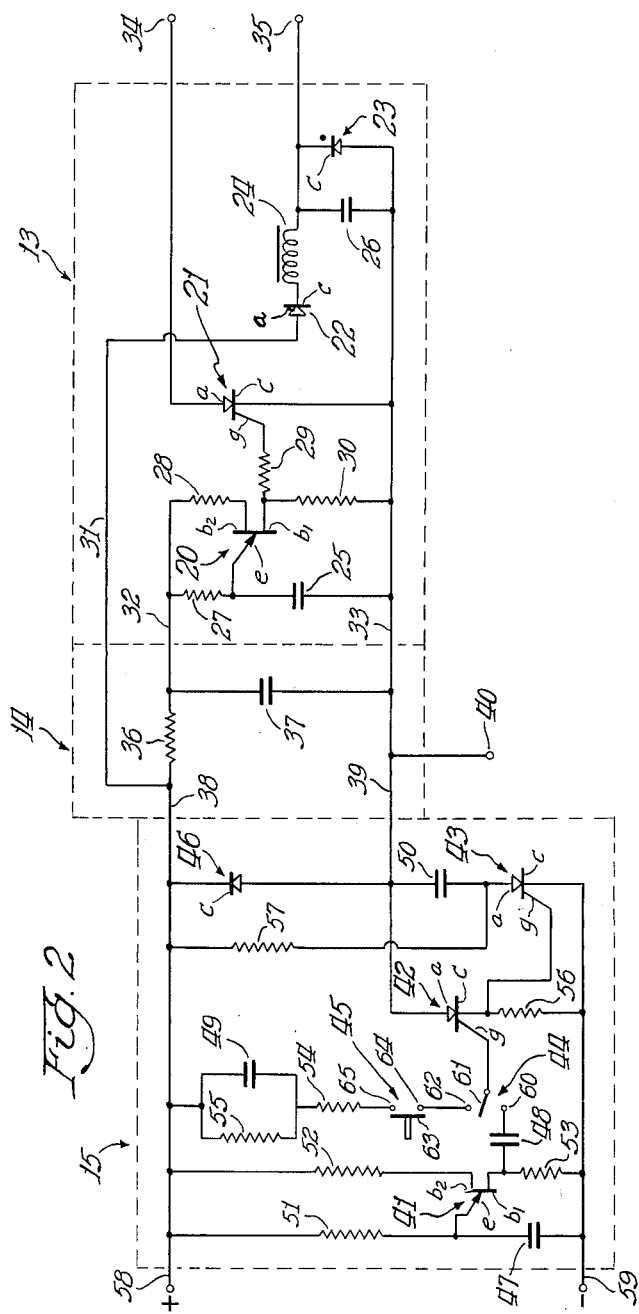
Inventor
Edward M. Schmidt
By: Ray E. Snyder Atty.

United States Patent Office 3,037,158
Patented May 29, 1962

3,037,158
PROTECTIVE RECYCLING CIRCUIT FOR STATIC INVERTER
Edward M. Schmidt, Evanston, Ill., assignor to Borg-Warner Corporation, Chicago, Ill., a corporation of Illinois
Filed Oct. 28, 1959, Ser. No. 849,249
4 Claims. (Cl. 321—14)

This invention relates to a short-circuit or overload protective circuit particularly for use with a static inverter.

It is an object of the present invention to provide a protective circuit adapted to be used with a static inverter that functions to prevent damage to the inverter circuit when excess currents are drawn or when the inverter fails for any reason.

It is an additional object to provide a protective circuit for use with a static inverter that shuts off the power to the static inverter in the event of a short-circuit or inverter failure, and that automatically recycles or tends to restart the inverter until the short-circuit condition is corrected.

It is also an object to provide a protective circuit as described in the preceding object that optionally includes manual or automatic recycling of the inverter.

It is still another object to provide a protective circuit for a static inverter that is effective to protect the inverter from transients in the power line that would ordinarily damage or cause failure of the inverter, and that automatically recycles the inverter promptly after the transient is past.

The invention consists of the novel constructions, arrangements, and devices to be hereinafter described and claimed for carrying out the above stated objects and such other objects as will appear from the following description of a preferred form of the invention, illustrated with reference to the accompanying drawings, wherein:

FIGURE 1 is a block diagram of the static inverter and protective circuit, and including a pulse generator and a time delay circuit; and FIGURE 2 is a schematic diagram of the pulse generator, the time-delay circuit and the protective circuit.

The present invention comprises a static inverter designated generally by the numeral 10 having a logic section 11 and a power section 12, a pulse generator 13 connected to the logic section 11, a time-delay circuit 14 connected to the pulse generator 13, and a protective circuit 15 connected to the time-delay circuit 14.

The static inverter 10 is adapted to provide a three-phase output voltage from a D.C. source and may be of the type described in my copending application, Serial No. 797,803, filed March 6, 1959.

Referring to FIG. 2, the pulse generator 13 comprises a unijunction transistor 20, a controlled rectifier 21, a diode 22, a Zener diode 23, an induction coil 24, capacitors 25 and 26, and resistors 27, 28, 29 and 30. The pulse generator circuit 13 has three input conduits 31, 32 and 33 connected to the delay circuit 14, and two output conduits 34 and 35 connected to the logic section 11 of the inverter 10. The input conduit 31 is connected to the anode $a$ of the diode 22, and the cathode $c$ of the diode 22 is connected through the coil 24 to the output conduit 35. The emitter $e$ of the unijunction transistor 20 is connected through the resistor 27 to the input conduit 32 and through the capacitor 25 to the input conduit 33. One base, $b_2$, of the transistor 20 is connected through the resistor 28 to the input conduit 32. The other base, $b_1$, is connected through the resistor 30 to the input conduit 33 and through the resistor 29 to the gate $g$ of the controlled rectifier 21. The cathode $c$ of the controlled rectifier 21 is connected to the input conduit 33 and the anode $a$ is connected to the output conduit 34. The capacitor 26 and the Zener diode 23 are connected in parallel between the input conduit 33 and the output conduit 35, the cathode $c$ of the Zener diode 23 being connected to the output conduit 35.

The time-delay circuit 14 comprises a resistor 36 and capacitor 37. The delay circuit 14 also has two input conduits 38 and 39 connected to the protective circuit 15 and three output conduits 31, 32 and 33 leading to the pulse generator 13.

The conduit 31 is connected directly to the input conduit 38; the resistor 36 is connected between the input conduit 38 and the output conduit 32; and the capacitor 37 is connected between the output conduit 32 and the input conduit 39. The input conduit 39 is connected directly to the output conduit 33 and to a negative terminal 40 of the power section 12 of the inverter 10.

The protective circuit 15 comprises a unijunction transistor 41, controlled rectifiers 42 and 43, switches 44 and 45, a diode 46, capacitors 47, 48, 49 and 50, and resistors 51, 52, 53, 54, 55, 56 and 57. The circuit 15 also comprises two input conduits 58 and 59 connected to a D.C. source, and output conduits 38 and 39 leading to the delay circuit 14.

The input conduit 58 is connected to the positive terminal of the D.C. source and is also connected to the power section 12 of the inverter 10, and the conduit 59 is connected to the negative terminal of the D.C. source. The voltage applied between the input conduits 58 and 59 preferably may be 28 volts D.C., for the value of components used.

The resistor 51 and capacitor 47 are connected in series between the input conduits 58 and 59. The emitter $e$ of the unijunction transistor 41 is connected to a junction between the resistor 51 and the capacitor 47. The base $b_2$ of transistor 41 is connected through resistor 52 to the conduit 58, and base $b_1$ is connected through resistor 53 to the conduit 59 and through the capacitor 48 to one terminal 60 of the switch 44.

The switch 44 is of the single-pole, double-throw type having a center pole 61 and a second terminal or contact 62. The switch 45 is of the normally open single-pole, single-throw type having a push button operated contact 63 and terminals 64 and 65. The terminal 64 is connected directly to the terminal 62 of the switch 44, and the terminal 65 is connected through the resistor 54 and the parallel combination of capacitor 49 and resistor 55 to the input conduit 58.

The gate $g$ of the rectifier 42 is connected directly to the center pole 61 of the switch 44; the anode $a$ of the rectifier 42 is connected directly to the output conduit 39; and the cathode $c$ of the rectifier 42 is connected directly to the gate $g$ of the rectifier 43 and through the resistor 56 to the input conduit 59.

The cathode $c$ of the rectifier 43 is connected directly to the input conduit 59, and the anode $a$ of the rectifier 43 is connected through the resistor 57 to the input conduit 58 and through the capacitor 50 to the output conduit 39. The diode 46 is connected directly between the output conduits 38 and 39, with its cathode $c$ being connected to the conduit 38.

In operation, the pulse generator 13, the delay circuit 14, and the protective circuit 15 operate as follows:

The pulse generator 13 supplies a series of pulses for operating the logic section 11 of the inverter 10 through the output conduits 34 and 35. To generate these pulses, the unijunction transistor 20 operates as a relaxation oscillator. The capacitor 25 is charged by means of current flowing from the conduit 32 through the resistor 27 to the conduit 33, and the voltage across the capacitor 25 is applied to the emitter $e$ of the transistor 20. When the voltage at the emitter $e$ reaches a predetermined magnitude, the transistor 20 conducts, and current flows from the conduit 32 through the resistor 28, the base $b_2$, the base $b_1$ and the resistor 30 to the conduit 33. Current flowing through the resistor 30 develops a positive voltage across it and this positive voltage is applied to the gate $g$ of the controlled rectifier 21. This positive voltage triggers the rectifier 21 into conduction and supplies a high-energy pulse through the conduit 34 to the logic section 11 of the inverter 10.

The frequency generated by the pulse generator 13 is determined by the magnitude of voltage appearing between the conduit 38 and the terminal 40 and the values of the resistors 36, 27 and capacitor 25. The coil 24 and capacitor 26 constitute a series resonant circuit tuned to a frequency of approximately one-half, or greater, of the output frequency of the pulse generator 13. The capacitor 26 is charged by current flowing from the conduit 31 through the diode 22 and coil 24 to the conduit 33. The Zener diode 23 functions to regulate the voltage across the capacitor 26 at a substantially constant value. When the rectifier 21 conducts, the capacitor 26 discharges and thereby supplies a substantially constant energy pulse through the conduit 35 to the logic section 11 of the inverter 10.

The protective circuit 15 provides for either manual or automatic recycling or restarting of the inverter 10 depending on the position of the switch 44. With the center pole 61 in contact with the terminal 62, manual recycling is obtained by momentarily closing the switch 45. Closing the switch 45 connects the gate $g$ of the controlled rectifier 42 through the resistor 54 and parallel combination of resistor 55 and capacitor 49 to the positive input conduit 58 thereby triggering the rectifier 42 into conduction. Before the controlled rectifier 42 conducts, the voltage difference between conduits 38 and 39 is zero. Triggering the rectifier 42 into conduction effectively connects the output conduit 39 to the input conduit 59 through the rectifier 42 and resistor 56. The resistor 56 is of a comparably small value, i.e. approximately .1 ohm. The voltage appearing on the conduit 39 is effectively the same as that on the conduit 59, except for the voltage drop across the resistor 56 and rectifier 42, which drop may amount to approximately two volts.

The voltage difference established between conduits 38 and 39 is connected through the conduit 58 and terminal 40 to the power section 12 of the inverter 10, and constitutes the operating voltage for the inverter 10. The same voltage difference is supplied to the delay circuit 14 and, in turn, is supplied to the pulse generator 13. This voltage is also the charging voltage for the capacitor 25 and, therefore, is the input operating voltage for the pulse generator 13. The purpose of the time delay provided by circuit 14 will be described hereinafter.

In normal operation, the voltage difference established between the conduits 38 and 39 causes a current of some reasonable magnitude to flow through the power section 12 of the inverter 10, depending upon the load connected thereto. This same current flows through the controlled rectifier 42 and resistor 56.

The voltage difference established between the conduits 38 and 39 also causes current to flow through the resistor 57 charging the capacitor 50. When the capacitor 50 is charged to the operating voltage, it stores electrical energy proportional to the square of the voltage, and the current through the resistor 57 stops.

In the event that a short-circuit or overload condition occurs at the load connected to the power section 12, the current flowing through the rectifier 42 and resistor 56 increases above a desirable predetermined maximum. Current flowing through the resistor 56 develops a proportional voltage difference across it which is applied to the gate $g$ of the controlled rectifier 43. The resistor 56, therefore, effectively senses or detects an excess current condition. When this voltage across the resistor 56 reaches a predetermined magnitude corresponding to the desirable maximum current through the resistor 56, the rectifier 43 is triggered into conduction. The conducting rectifier 43 discharges the capacitor 50, shutting off the rectifier 42. After the capacitor 50 has discharged, the rectifier 43 shuts itself off. Shutting off rectifier 42 effectively opens the circuit and causes the operating voltage difference between conduits 38 and 39 to drop to zero.

The inverter 10 is set in operation again by manually closing the switch 45. Closing the switch 45 causes the rectifier 42 to be triggered into conduction again and the pulse generator 13 is set into oscillation, as previously described. If the short-circuit or overload condition still exists, this condition is reflected back to the resistor 56, capacitor 50 and rectifier 43 for again shutting off the rectifier 42.

In order to shut off the rectifier 42, it is necessary that the capacitor 50 be charged to the operating voltage. To ensure that the capacitor 50 is charged substantially to this value, the time-delay circuit 14 is provided which delays the starting of the pulse generator 13 and thereby delays the operation of the inverter 10. The protective circuit 15, therefore, functions to cut off the voltage to the inverter 10 so long as the short-circuit or overload condition persists.

In restarting the inverter in manual operation, it is desirable that a pulse of short duration be applied to the gate $g$ of the rectifier 42 for triggering it into conduction. The triggering pulse is obtained by current flowing from the conduit 58 through the capacitor 49 and resistor 54 to the gate $g$, and through the resistor 56 to the conduit 59. When the capacitor 49 is charged to the line voltage difference between conduits 58 and 59, the current to the gate $g$ drops to a negligible value. Some current still flows through the resistors 55 and 54 to the gate $g$, but this current is small because the resistor 55 is quite large. The resistor 55 does serve the function of discharging the capacitor 49 when the switch 45 is open so that the capacitor 49 will be in condition to supply another pulse to the rectifier 42 when the switch 45 is again closed.

Automatic recycling or restarting of the inverter is provided by means of the unijunction transistor 41 and related components. For automatic recycling, the center pole 61 of the switch 44 is placed in contact with the terminal 60. The transistor 41 operates as a relaxation oscillator for providing a series of pulses through the capacitor 48 and switch 44 to the gate $g$ of the rectifier 43.

In operation, the voltage between the input conduits 58 and 59 causes current to flow through resistor 51 charging the capacitor 47. As the capacitor 47 is charged the voltage across it rises, and this voltage is applied to the emitter $e$ of the transistor 41. When the voltage across the capacitor 47 reaches a predetermined magnitude, the transistor 41 is triggered into conduction and current flows from the conduit 58 through the resistor 52, the base $b_2$, the base $b_1$, and resistor 53 to the conduit 59. A voltage is developed across the resistor 53 by current flowing therethrough and this voltage is applied through the capacitor 48 and switch 44 to gate $g$ of the controlled rectifier 42 for triggering it into conduction. Triggering the rectifier 42 into conduction establishes the operating voltage between conduits 38 and 39, as previously described. The transistor 41, therefore, functions to supply a steady series of pulses, and continually tries to restart the inverter 10.

The repetition frequency or pulse rate generated by the transistor 41, combined with the time delay produced by the circuit 14, should be predetermined and should be of sufficient duration to ensure that the power to the inverter 10 is cut off for a major portion of the time so that no damage can occur to the inverter 10 or to the load connected thereto. Conversely, the repetition frequency of the transistor 41 should be sufficiently high to ensure that the inverter and load are operable promptly after the short-circuit or overload condition has been removed. This is particularly true when the overload condition is caused by a transient in the power line appearing across the input conduits 58 and 59. Such a transient might be caused, for example, by a highly inductive load that is switched on or off and is operated from the same D.C. source connected to the input conduits 58 and 59.

As a preferred example, the circuits described above may use the type of components and have the component values as follows:

For the pulse generator circuit 13:

| | | |
|---|---|---|
| 20 | Unijunction transistor | 2N491. |
| 21 | Controlled rectifier | C35A. |
| 22 | Silicon diode | 1N645. |
| 23 | Zener diode | 1N1366. |
| 24 | Inductor | 200 mh. |
| 25 | Capacitor | .1 µf. |
| 26 | Capacitor | .2 µf. |
| 27 | Resistor | 8.2K ohms. |
| 28 | Resistor | 150 ohms. |
| 29 | Resistor | 15 ohms. |
| 30 | Resistor | 100 ohms. |

For the time-delay circuit 14:

| | | |
|---|---|---|
| 36 | Resistor | 100 ohms. |
| 37 | Capacitor | 50 µf. |

For the protective circuit 15:

| | | |
|---|---|---|
| 41 | Unijunction transistor | 2N491. |
| 42 | Controlled rectifier | C35A. |
| 43 | Controlled rectifier | C35A. |
| 44 | Switch | SPDT. |
| 45 | Push button switch | Normally open SPST. |
| 46 | Silicon diode | 1N1582. |
| 47 | Capacitor | 1 µf. |
| 48 | Capacitor | .03 µf. |
| 49 | Capacitor | .05 µf. |
| 50 | Capacitor | 30 µf. |
| 51 | Resistor | 150K ohms. |
| 52 | Resistor | 510 ohms. |
| 53 | Resistor | 51 ohms. |
| 54 | Resistor | 1K ohms. |
| 55 | Resistor | 510K ohms. |
| 56 | Resistor | .1 ohm. |
| 57 | Resistor | 20 ohms. |

There has been provided by this invention, a protective circuit adapted to be used with a static inverter that is operable to shut off power to the inverter when an overload or short-circuit condition exists. The protective circuit may be recycled for restarting the inverter by either manual or automatic operation. The protective circuit ensures that the inverter 10 is restarted promptly after the short-circuit or overload condition has been removed. The protective circuit is also effective to recycle the inverter in the event an overload condition is produced by transients in the input power line.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. In an overload protective circuit for a static inverter, the combination of a source of D.C. power for operating the inverter, conduit means for delivering power from said source to the inverter, means including a controlled rectifier connected in said conduit means for setting the inverter into operation, detecting means interconnected with said rectifier for sensing the flow of excess current to the inverter, means including an energy storage device connected to said rectifier and operable by said detecting means for cutting off the flow of current to the inverter, and pulse generating means operably connected to trigger said controlled rectifier into conduction for restarting the inverter.

2. In an overload protective circuit for a static inverter, the combination of a source of D.C. power for operating the inverter, conduit means interconnecting said source with the inverter, means including a first controlled rectifier connected in said conduit means for setting the inverter into operation, detecting means connected to said rectifier for sensing the magnitude of current flow to the inverter, means connected to said rectifier for triggering it into conduction for starting the inverter, and means for cutting off said rectifier for thereby shutting off power to the inverter when the current flow sensed by said detecting means exceeds a predetermined magnitude, said power shut-off means including a second controlled rectifier connected to and operable by said detecting means and a capacitor for storing electrical energy, said second rectifier being effective to discharge said capacitor and thereby stop conduction of said first rectifier when said second rectifier is set into conduction by said detecting means.

3. In an overload protective circuit for a static inverter, the combination of a source of D.C. power for energizing the inverter, pulse generating means connected to the inverter for operating it at some frequency, means including a controlled rectifier for connecting said power source to said inverter and to said pulse generating means, means connected to said rectifier for triggering it into conduction for setting the pulse generator and inverter into operation, means including a capacitor connected to said source and to said rectifier for storing electrical energy and operable when discharged to stop the conduction of said rectifier, sensing means connected to said rectifier and responsive to excess current flow through the inverter and operable to discharge said capacitor, and time-delay means interconnecting said rectifier with said pulse generator for ensuring the charging of said capacitor before said current sensing means is operable.

4. In an overload protective circuit for a static inverter, a combination of a source of D.C. power for energing the inverter, means including a controlled rectifier and electrical conduits for connecting the power source to the inverter, detecting means connected to said rectifier for sensing the flow of excess current to the inverter, means including an energy storage device connected to said rectifier and operable by said detecting means for cutting off said rectifier and thereby stopping the power to the inverter, and pulse generating means for supplying a series of pulses of short duration connected to said rectifier for automatically restarting the inverter.

References Cited in the file of this patent

UNITED STATES PATENTS 2,741,527    Burger _____ Apr. 10, 1956